| United States Patent [19] | [11] Patent Number: 4,809,319 |
|---|---|
| McGough | [45] Date of Patent: Feb. 28, 1989 |

[54] COIN-OPERATED TELEPHONE APPARATUS

[75] Inventor: Gerald B. McGough, Huntsville, Ala.

[73] Assignee: Palco Telecom, Inc., Nashville, Tenn.

[21] Appl. No.: 142,850

[22] Filed: Jan. 11, 1988

[51] Int. Cl.$^4$ ........................................... H04M 17/02
[52] U.S. Cl. ........................................ 379/153; 74/96
[58] Field of Search ............... 379/146, 153, 150, 155; 74/96

[56] References Cited

U.S. PATENT DOCUMENTS 2,897,271  7/1959  Horn et al. ........................... 379/153

*Primary Examiner*—Stafford D. Schreyer
*Attorney, Agent, or Firm*—C. A. Phillips

[57] ABSTRACT

A coin-operated telephone having a housing enclosing a coin acceptor having a coin release mechanism secured thereto. A coin release mechanism actuator assembly is carried in the housing and disposed for actuation of the coin release mechanism by causing upward pivotal movement thereof. The coin release mechanism includes a downwardly depending member which is engaged by a roller of the actuator assembly which is comprised of two pivotal L-shaped members connected by a link or rod for transmitting pivotal movement from a first of the pivoted members to a second of the pivoted members. Stops are provided to limit the movement of the members to prevent binding thereof.

6 Claims, 2 Drawing Sheets

COIN-OPERATED TELEPHONE APPARATUS

TECHNICAL FIELD

This invention relates generally to coin-operated telephones and more particularly to a coin release mechanism for such coin-operated telephones.

BACKGROUND OF THE INVENTION

A coin-operated telephone typically includes a coin acceptor provided with a stuck coin release mechanism which is mounted inside the weldment or housing. The stuck coin mechanism is operatively connected to a lever which is mounted on the external face and extends into the housing. It has been found that the appearance of the external face of the housing and the manner in which externally mounted components function plays a major part in the acceptance of the telephone structure by the public.

To satisfy the desires of the public, it is necessary that the telephone be familiar and user-friendly. This necessitates that the coin release mechanism lever be located on the upper central portion of the housing instead of being located at various other positions on the face of the housing, as has been done in many existing pay telephones. While it is desirable to provide a pay telephone with a stuck coin release lever which is mounted in the upper central portion of the housing in a user-friendly position, it is also desirable that the stuck coin release structure be compatible with existing "off-the-shelf," industry standard coin acceptors and associated release mechanisms.

The structure of the present invention provides such desirable features and includes a linkage assembly consisting of a coin release bar, a rod, and a roller bracket assembly with mounting and stop features which are attached to the upper central portion of the upper housing. No modifications to the industry standard coin acceptor and associated coin release system are required. Full travel of the linkage assembly and protection against jamming is provided by proper selection of beginning and end positions of the rod link bearing surfaces and coin release bar stops which are located so that the rod bearing positions are below the respective pivot points of the coin release bar and the roller bracket assembly. Additionally, by providing stops which are disposed for engagement by a coin release bar which is directly secured to and operated by the coin release lever, excessive forces applied to the coin release lever cannot be transmitted beyond these stops. Other prior art devices rely upon stops positioned in various other locations in the system, and intermediate members of the system could be distorted by the excessive force.

It is, therefore, an object of the present invention to provide a coin release mechanism for use in a coin-operated telephone while also maintaining a familiar user-friendly appearance of the telephone.

It is a further object of the present invention to provide a coin-operated telephone with a housing having internal components positioned therein in a manner which will provide an extra large interior to permit add-on features to be installed while still maintaining a familiar, user-friendly appearance and function.

It is a still further object of the present invention to provide such a telephone with a coin release mechanism linkage which provides for positive actuation of the coin release mechanism from a position in the housing which will not interfere with the ability of the housing to later receive the add-on features.

Yet still another object of the present invention is to provide such a coin release mechanism which is substantially jam-proof and which is protected from excessive force applied by users and vandals.

SUMMARY OF THE INVENTION

A coin-operated telephone in which the internal coin release mechanism and linkage therefor is located in a position which will permit add-on "smart" features to be later installed. The housing encloses a coin acceptor and associated coin release mechanism and a coin release mechanism actuator assembly. The coin release mechanism and the actuating assembly are secured to the top of the coin acceptor. A linkage is connected to the coin release lever mounted on the face of the housing and extends across the interior of the housing to engage the coin release mechanism of the coin acceptor. The linkage includes a spring biased bar or plate having an inverted L-shaped configuration pivotally mounted in the housing and having a rod secured thereto which extends therefrom for secured relation to a second L-shaped mechanism pivotally mounted in the housing and having a roller thereon which engages a lip on the coin release mechanism for upward movement thereof for operation of the release mechanism.

DESCRIPTION OF THE PREFERRED EMBODIMENT

Figure 1:
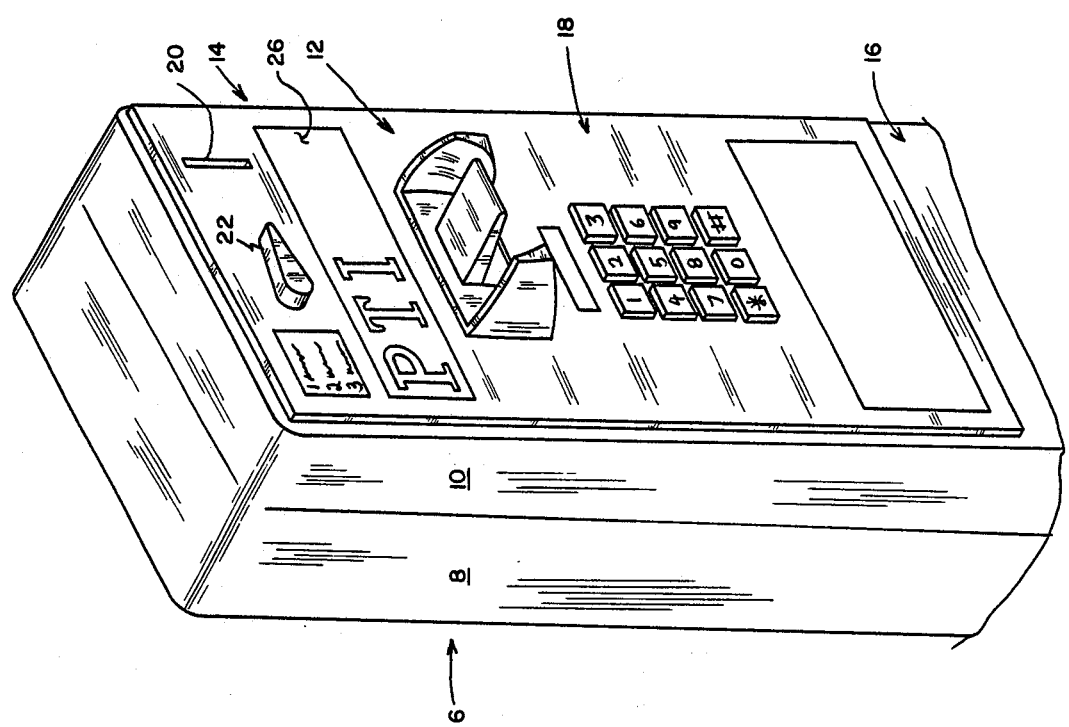
FIG. 1 is a front pictorial view of a coin-operated telephone illustrating the positions of the coin slot, the coin release actuating lever, and the display area.

As seen in FIG. 1, a coin-operated telephone includes a housing 6 having a pair of releasably attached sections 8 and 10. Section 10 includes a forward face 12, an upper coin receiving and display area 14, and a lower coin storage area 16. A central handset and dial area 18 is disposed intermediate areas 14 and 16. Upper area 14 includes a slot 20 for receiving coins and a lever 22 for actuating a coin release mechanism of a coin acceptor 24 (FIGS. 3 and 4) for releasing stuck coins. A display window 26 is provided in upper area 14. Any of many types of displays may be used, such as LED's, to provide information, instructions, etc.

Figure 4:
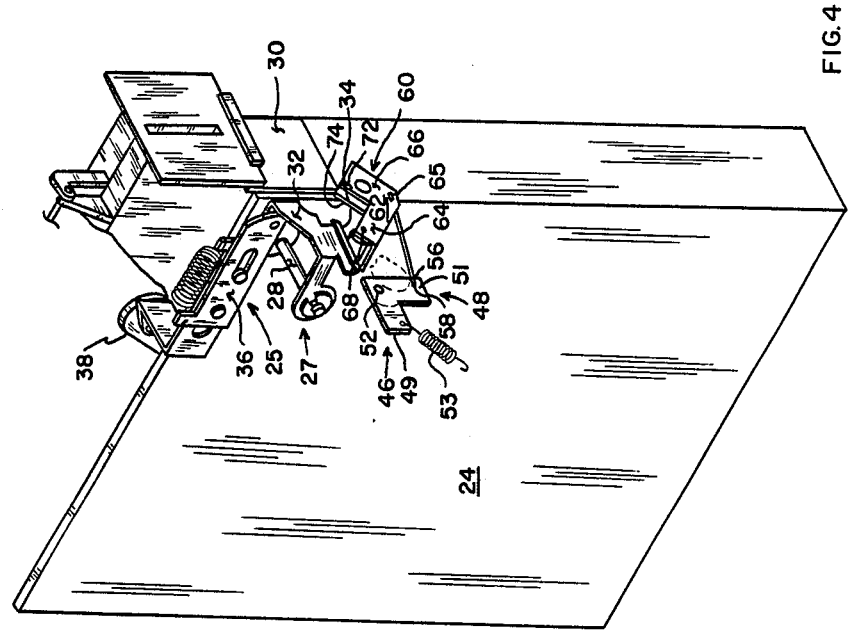
FIG. 4 is a pictorial view of the release linkage in engagement with the actuating mechanism of the coin acceptor.
Figure 3:
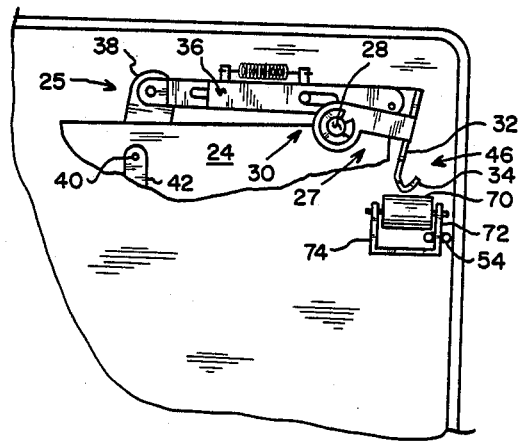
FIG. 3 is a side elevational view illustrating the coin release actuating linkage in engagement with an actuating mechanism of a coin acceptor for release of coins.

As seen in FIGS. 3 and 4, coin acceptor 24 is provided at the top thereof with a coin release mechanism 25. A coin release mechanism actuating assembly 27 is also pivotally mounted at the top 30 of the coin acceptor by a pin 28. Actuating assembly 27 includes a forward member 32 having a lower elongated lip 34 depending therefrom. Coin release actuating assembly 27 includes a bar 36 in engagement with member 32 and secured to an arm 38 which is pivotally secured at pin 40 (FIG. 3) of the body of coin acceptor 24 which also includes a second arm 42 pivotally secured to pin 40 and in biased relation to the body of coin acceptor 24 by a spring (not shown). The coin acceptor is not described in detail herein as it may be any of many commercially available acceptors. A typical acceptor is manufactured by Coinco of St. Louis, Mo.

Figure 2:
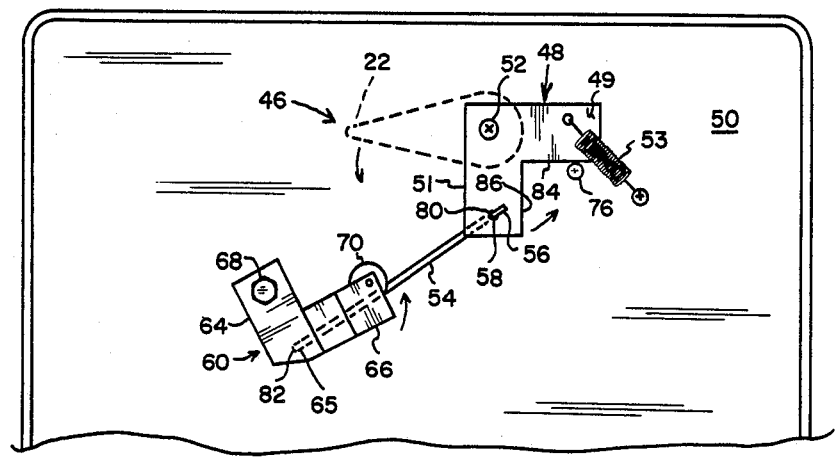
FIG. 2 is a rear elevational view of the interior of the housing illustrating the coin release mechanism actuating linkage.

To provide for upward pivotal movement of member 32 of coin release actuator assembly 27, a linkage assembly 46 (FIGS. 2 and 4) is secured in the interior of the housing for pivotal movement by lever 22. The linkage assembly includes a substantially inverted L-shaped flat plate 48 which is pivotally secured to the back side surface 50 of the face 12 of the housing by a pin 52 which also rigidly connects to lever 22 on the front face 12. Plate 48 includes a pair of normally disposed legs 49 and 51. A spring 53 is secured to leg 49 and to surface 50 for biased relation of plate 48. A rod 54 has an end 56 inserted in an opening 58 of plate 48 and extends therefrom for connection to a roller assembly 60 pivotally secured in the interior of the housing to surface 50. Assembly 60 includes a substantially L-shaped support member 62 which is provided with a substantially L-shaped configuration having legs 64 and 66. Member 62 is pivotally secured to surface 50 by a pin 68 disposed at the upper end of leg 64. A roller 70 is secured to the distal end of leg 64 between a pair of spaced support portions 72 and 74 (FIGS. 3 and 4) of leg 64. The second end 65 (FIGS. 2 and 4) of rod 54 is connected at the juncture of legs 64 and 66 of to support member 62 for pivotal movement thereof responsive to pivotal movement of plate 48.

To retrieve stuck coins, the customer depresses lever 22, which pivots plates 48 about pin 52 in a counterclockwise direction for upward movement of roller 70, which rolls across the elongated lip portion 34 of member 32 for actuating arms 38 and 42 of the coin acceptor for release of the inserted stuck coins from coin acceptor 24.

Figure 5:
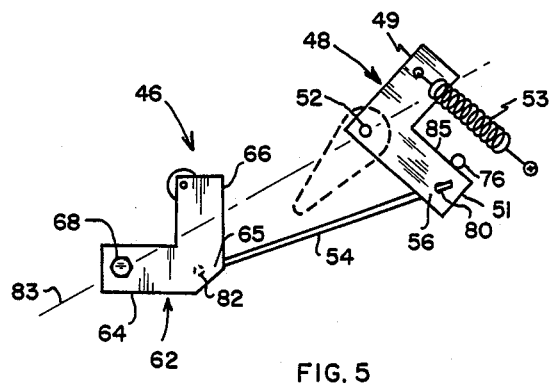
FIG. 5 is a view similar to FIG. 2 but illustrating the coin release mechanism displaced to its actuating position.

As seen in FIG. 5, linkage assembly 46 has been displaced from its non-actuating position to its actuating position. In this actuating position, it is seen that a stop 76 which is secured to surface 50 assures that the bearing surfaces 80 at the end 56 of rod 54 (at bracket 48) and the bearing surfaces 82 at the end 65 of rod 54 (at bracket 62) are substantially below a line 83 connecting the respective pivot points 52 and 68 of brackets 48 and 62, respectively. Such structure prevents the members from approaching "over center" positions, which tend to jam the mechanism. The stop is located adjacent to the lower surface 84 (FIG. 2) of leg 49 of member 48 and is disposed for engagement by surface 86 (FIG. 5) of leg 51 of member 48 when the linkage is rotated.

I claim:

1. A coin-operated telephone comprising:
   a housing having a pair of sections disposed for releasable engagement, a first of said sections having a face and upper, lower, and intermediate sections, and a display area disposed in said upper sections, said second of said sections having an upper portion for receiving said first of said pair of sections and a lower coin storage section;
   a coin acceptor and associated coin release mechanism mounted in said second of said pair of housing sections, said coin acceptor having a coin release mechanism actuator assembly secured thereto for actuating said release mechanism of said coin acceptor, said release mechanism actuator assembly including a plate having a downwardly depending elongated lip; and
   a coin release linkage assembly secured to the interior surface of said face above said display window, said coin release linkage assembly including a flat plate having a substantially inverted L-shaped configuration pivotally secured to the interior surface of said face of said first of said pair of housing sections, a rod having one end secured to said flat plate, said rod extending from said flat plate, a second L-shaped member mounted to said interior face of said first of said housing sections in spaced relation with said flat plate, said rod having its second end secured to said second L-shaped member, a roller mounted on said second L-shaped member for operative engagement with said elongated lip of said actuator assembly for actuating said coin release mechanism, a lever mounted on said face of said first of said housing sections in said upper section thereof, said lever secured to said inverted L-shaped flat plate for pivotal movement thereof, and biasing means secured to said flat inverted L-shaped member and said housing for biased relation of said linkage assembly and said housing.

2. Apparatus as in claim 1 wherein said release mechanism actuator includes a member pivotally mounted to an upper portion of said coin acceptor in biased relation therewith and having a forward portion defining said downwardly depending elongated lip, the longitudinal axis of said roller disposed in normal relationship with said elongated lip for rolling movement thereacross responsive to a pivotal movement being applied to said lever.

3. Apparatus as in claim 2 wherein said flat inverted L-shaped member is defined by a pair of legs disposed in normal relation with said biasing means being secured to a first of said legs, and the first end of said rod being secured to the second of said pair of legs, and pivotal mounting means secured to the juncture of said legs and to said lever.

4. Apparatus as in claim 3 wherein said second L-shaped member is defined by a pair of legs disposed in normal relation, said roller disposed at the distal end of said first of said pair of legs, and means for pivotally mounting said second L-shaped member disposed at the distal end of said second of said pair of legs, said second end of said rod being secured at the juncture of said pair of legs.

5. Apparatus as in claim 4 wherein said first of said pair of legs includes a pair of upstanding sides, a pin mounted in and extending between said sides, said roller mounted on said pin.

6. Apparatus as in claim 5 including stop means secured to the interior surface of said first section adjacent to a lower surface of said first of said legs of said flat L-shaped member, whereby, responsive to rotation of said inverted L-shaped member, said stop means is engaged by said lower surface to prevent further rotation and thereby prevents the points of connection of said rod ends with said inverted and second L-shaped members from approaching too closely a line drawn between the pivot points of said inverted and second L-shaped members to prevent "over-center" travel of said L-shaped members

* * * * *